2,915,561
Patented Dec. 1, 1959

2,915,561

PROCESS FOR MAKING SUBSTITUTED 2,3-HEXANEDIOLS

Marion S. Carpenter, Nutley, William M. Easter, Jr., Hasbrouck Heights, and Thomas F. Wood, Little Falls, N.J., assignors to The Givaudan Corporation, New York, N.Y., a corporation of New Jersey No Drawing. Application February 23, 1955
Serial No. 490,116

3 Claims. (Cl. 260—618)

This invention relates to a novel musk material and to a process for preparing it.

Most of the known synthetic musk-like compounds fall into two classes: (1) nitrated aromatic hydrocarbons, such as musk xylene, and (2) macrocyclic ketones, lactones or esters, such as cyclopentadecanone, cyclopentadecanolide and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkalies, are difficult to manufacture and are relatively costly.

We have found that acetyl-1,1,3,4,4-pentamethyl-1,2,3,4-tetrahydronaphthalene and acetyl-1,1,3,4,4,6-hexamethyl-1,2,3,4-tetrahydronaphthalene have the desirable property of being musk-like in olfactory character and yet are extremely stable to light and to alkalies as well as being inexpensive to manufacture.

In general, our novel musk materials are prepared by reacting benzene or toluene with 2,2,5,5-tetramethyltetrahydro-3-furanol in the presence of an agent such as anhydrous aluminum chloride; dehydrating the resulting compound in the presence of an agent such as sulfuric acid; effecting a Grignard reaction on the dehydrated material with methyl magnesium iodide, dehydrating the resulting substance in the presence of an agent such as toluene sulfonic acid, cyclizing the resulting material in the presence of an agent such as sulfuric acid and acetylating the cyclization product with a material such as acetyl chloride in the presence of aluminum chloride.

It will be readily apparent that our novel musk-like compounds can be employed in widely-varying formulations, depending upon the type of formulation, the odor effect desired, the desires of the compounder of the formulation, etc. Consequently, we do not wish to confine ourselves to any particular formulation, but wish it to be understood that our products can be employed as musks in perfume-containing formulations in general. By the term "perfume containing" we include, inter alia, perfumes, cosmetics, soaps.

The following examples illustrate the practice of our invention.

EXAMPLE 1

*Preparation of acetyl-1,1,3,4,4-petamethyl-1,2,3,4-tetrahydronaphthalene*

(a) *2,2,5,5-tetramethyltetrahydro-3-furanol.*— This material was prepared by the catalytic hydrogenation of the known 2,2,5,5-tetramethyltetrahydro-3-furanone in a stainless steel autoclave using 282 g. of the ketone, 20 g. of copper chromite catalyst, hydrogen at 500 to 600 lbs./in.$^2$ and reaction temperature of 140–144° C. The yield of 2,2,5,5-tetramethyltetrahydro-3-furanol, a colorless liquid solidifying at room temperature, B.P. 63–64° C. (3 mm.), $d_{25}^{25}$ 0.9498, $n_D^{20}$ 1.4419, M.P. 27° C., cong. pt. 26.5° C., purity 99.0% (acetylation) was quantitative.

(b) *2,5 - dimethyl-5-phenyl-2,3-hexanediol.*—Into a stirred suspension of 148 g. granular anhydrous AlCl$_3$ and 500 g. benzene at room temperature was added a solution of 72 g. 2,2,5,5-tetramethyltetrahydro-3-furanol, described above, in 100 g. benzene keeping the temperature at 20–25° C. After being stirred for 2 hrs. at 35–40° C. the solution was quenched onto 1,000 g. cracked ice with good stirring. The benzene solution was separated from the quench water, washed successively with water, 5% soda ash solution and again with water. After distilling off the benzene the product was vacuum-distilled. The 2,5-dimethyl - 5 - phenyl-2,3-hexanediol, amounting to 65 g. (58.5% of theory), was obtained as a viscous liquid, B.P. 126–128° C. (2 mm.), $n_D^{20}$ 1.5190.

(c) *2,5 - dimethyl-5-phenyl-3-hexanone.*—Into 400 g. of 30% sulfuric acid stirred at reflux temperature was fed 111 g. of 2,5-dimethyl-5-phenylhexane-2,3-diol during a 1 hr. period. The mixture was then refluxed, with stirring, 1 hr. longer and finally steam-distilled until the distillate was nearly free of oil. The distillate consisted of 77 g. of oil and 5,635 g. of water. The oil was vacuum-distilled yielding 66 g. of 2,5-dimethyl-5-phenyl-3-hexanone, B.P. 97–101.5° C. (3 mm.), $n_D^{20}$ 1.5048–1.5070.

(d) *2,3,5 - trimethyl - 5 - phenyl-3-hexanol.*— Into the Grignard solution prepared from 15 g. of magnesium turnings, 206 g. absolute ether and 88 g. of methyl iodide was fed at reflux temperature (34° C.) 126 g. 2,5-dimethyl-5-phenyl-3-hexanone, described above in part (c), dissolved in 126 g. dry ether. The reaction mixture was refluxed 1 hr. after the feed. After quenching on 125 g. ice, 125 g. water and 33 g. ammonium chloride and working up in the usual manner there was obtained 99.0 g. of 2,3,5-trimethyl-5-phenyl-3-hexanol, B.P. 119–123° C. (4.5 mm.), $n_D^{20}$ 1.5103. The product was a viscous, colorless, odorless liquid.

(e) *2,3,5-trimethyl-5-phenyl-2-hexene.*—In a suitably provisioned apparatus there was stirred and refluxed with water separation a solution of 250 g. of benzene, 99 g. of 2,3,5-trimethyl-5-phenyl-3-hexanol and 0.25 g. p-toluenesulfonic acid. After removal of nearly the theoretical amount of water, the solution was neutralized, filtered and the benzene distilled off. Upon vacuum-distillation of the remaining liquid there was obtained 73.5 g. of 2,3,5-trimethyl-5-phenyl-2-hexene, B.P. 82–92° C. (2 mm.), $n_D^{20}$ 1.5023–1.5131.

(f) *1,1,3,4,4 - petamethyl - 1,2,3,4-tetrahydronaphthalene.*—Into 75 ml. of 93% sulfuric acid, kept at 0° C. and stirred, there was fed over a period of ¾ hr. 71 g. of 2,3,5-trimethyl-5-phenyl-2-hexene. After the feed the mixture was stirred ¾ hr. longer at 0° C. and quenched on 150 g. cracked ice. There was added 100 ml. benzene to facilitate the separation of the oil. After washing successively with water, 5% caustic soda solution, and water, the benzene was distilled off and the product vacuum-distilled. There was obtained 59 g. of 1,1,3,4,4-pentamethyl-1,2,3,4-tetrahydronaphthalene, a colorless, nearly odorless liquid, B.P. 103–4° C. (2.5 mm.), $n_D^{20}$ 1.5204.

(g) *Acetyl - 1,1,3,4,4 - pentamethyl-1,2,3,4-tetrahydronaphthalene.*—Into a mixture of 38.5 g. of anhydrous aluminum chloride in 135.0 g. ethylene dichloride was added dropwise at room temperature a solution of 50.5 g. 1,1,3,4,4 - pentamethyl - 1,2,3,4-tetrahydronaphthalene, described above (f), and 22.5 g. acetyl chloride over a period of 1 hr. (temp. 20–25° C.). The temperature was then increased to 40° C. and stirring continued for 30 minutes. After being quenched on ice the mixture was separated and the oil washed neutral. After distillation of the ethylene dichloride the residual oil was vacuum-distilled over 0.5 g. of soda ash. There was obtained the desired acetyl-1,1,3,4,4-pentamethyl-1,2,3,4-tetrahydronaphthalene, 35 g. B.P. 125–127° C. (2 mm.), $n_D^{20}$ 1.5349, a colorless viscous liquid, having a persistent musk-like odor. The acetyl group can occupy either the 6 or 7 positions.

Analysis:
  Calcd. for $C_{17}H_{24}O$: C, 83.60; H, 9.83.
  Found: C, 83.48; H, 9.74.

EXAMPLE 2

*Preparation of 7-acetyl-1,1,3,4,4,6-hexamethyl-1,2,3,4-tetrahydronaphthalene*

(a) *2,5 - dimethyl - 5 - p - tolyl-2,3-hexanediol.*—Into a stirred suspension of 148 g. granular anhydrous $AlCl_3$ in 500 g. of toluene there was added at room temperature a solution of 72 g. 2,2,5,5-tetramethyltetrahydro-3-furanol, previously described, in 100 g. toluene keeping the temperature at 20–25° C. After being stirred for 2 hrs. at 35–40° C. the solution was quenched onto 1,000 g. cracked ice with good stirring. The toluene solution was separated from the quench water, washed successively with water, 5% soda ash solution and again with water. After removal of toluene and vacuum-distillation of the product, there was obtained 74 g. of the glycol, 2,5-dimethyl-5-p-tolyl-2,3-hexanediol, B.P. 127–128° C. (1 mm.), $n_D^{20}$ 1.5192.

Analysis:
  Calcd. for $C_{15}H_{24}O_2$: C, 76.3; H, 10.17.
  Found: C, 76.26; H, 10.00.

(b) *2,5-dimethyl-5-p-tolyl-3-hexanone.*—Into 400 g. of 30% sulfuric acid, stirred at reflux temperature, was fed 118 g. 2,5-dimethyl-5-p-tolyl-2,3-hexanediol during a 1 hr. period. The mixture was then refluxed and stirred for 1 hr. longer. This was followed by steam-distillation until the distillate was nearly free of oil. The distillate consisted of 78.5 g. oil and 5,710 g. water. The oil was vacuum-distilled yielding 48 g. of 2,5-dimethyl-5-p-tolyl-3-hexanone, B.P. 96–105° C. (1 mm.), $n_D^{20}$ 1.5088–95.

(c) *2,3,5-trimethyl-5-p-tolyl-3-hexanol.*—Into the Grignard solution prepared from 9 g. of magnesium turnings, 122 g. anhydrous ether, and 52 g. methyl iodide was added at reflux (34° C.) a solution of 73 g. 2,5-dimethyl-5-p-tolyl-3-hexanone in 73 g. ether. The solution was refluxed 1 hr. after the feed and then quenched on 100 g. cracked ice plus 100 g. water. The mixture was carefully acidified by slow addition with stirring of 137 g. of 10% hydrochloric acid. The ether solution was worked up in the usual manner and the product distilled to yield 66 g. of 2,3,5-trimethyl-5-p-tolyl-3-hexanol, a colorless, viscous liquid, B.P. 105–109° C. (2 mm.), $n_D^{20}$ 1.5108. The yield was 84.7% of theory.

(d) *2,3,5-trimethyl-5-p-tolyl-2-hexene.*—In a suitably provisioned apparatus there was stirred and refluxed, with water separation, a solution of 200 g. of benzene 66 g. of 2,3,5-trimethyl-5-p-tolyl-3-hexanol and 0.25 g. of p-toluene sulfonic acid. After removal of nearly the theoretical amount of water, the solution was neutralized with soda ash, filtered and the benzene distilled off. Upon vacuum-distillation of the remaining liquid there was obtained 51.0 g. of 2,3,5-trimethyl-5-p-tolyl-2-hexene, B.P. 88–95° C. (1 mm.), $n_D^{20}$ 1.5085–1.5157. The yield was 83.6% of theory.

(e) *1,1,3,4,4,6-hexamethyl-1,2,3,4 - tetrahydronaphthalene.*—Into 55 ml. of 93% sulfuric acid, kept at 0° C. and stirred, there was fed in slowly over a ¾ hour period 48 g. of 2,3,5-trimethyl-5-p-tolyl-2-hexene. After the feed the mixture was stirred ¾ hour longer at 0° C. and quenched on 120 g. cracked ice. There was added 100 ml. of benzene to help the separation of the oil. After being washed successively with water, 5% caustic soda solution, and water, the solution was distilled to remove benzene. The residual oil was vacuum-distilled yielding 35.5 g. of colorless 1,1,3,4,4,6-hexamethyl-1,2,3,4-tetrahydronaphthalene, B.P. 90–93° C. (2 mm.), $n_D^{20}$ 1.5216. The yield was 74% of theory.

(f) *7-acetyl-1,1,3,4,4,6-hexamethyl - 1,2,3,4-tetrahydronaphthalene.*—Into a mixture of 24.0 g. of anhydrous aluminum chloride in 100.0 g. ethylene dichloride there was added drop-wise a solution of 35.0 g. of 1,1,3,4,4,6-hexamethyl-1,2,3,4-tetrahydronaphthalene in 14.0 g. acetyl chloride at room temperature (20–25° C.) over a period of 1 hr. Then stirring was continued at 40° C. for 30 minutes. After being quenched on ice (200 g.) the mixture was separated and the ethylene dichloride solution was washed neutral. After removal of the ethylene dichloride the residual oil was vacuum-distilled over 0.5 g. of soda ash. There was obtained the desired 7-acetyl-1,1,3,4,4,6 - hexamethyl - 1,2,3,4 - tetrahydronaphthalene, a colorless viscous liquid having a powerful and persistent musk-like odor. The yield was 24.5 g., B.P. 144° C. (2.5 mm.), $n_D^{20}$ 1.5359.

Analysis:
  Calcd. for $C_{18}H_{26}O$: C, 83.75; H, 10.07.
  Found: C, 83.74; H, 9.89.

The foregoing illustrates the practice of this invention, which, however, is not to be limited thereby but is to be construed as broadly as permissible in view of the prior art and limited solely by the appended claims.

We claim:
1. The process for making compounds represented by the structural formula:

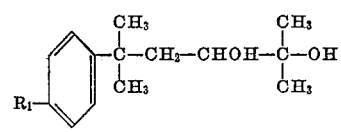

where $R_1$ is a member selected from the group consisting of hydrogen and methyl group, which comprises reacting a hydrocarbon having the formula:

where $R_1$ has the same significance as above, with 2,2,5,5-tetramethyltetrahydro-3-furanol, in the presence of anhydrous aluminum chloride.

2. The process of claim 1, wherein benzene is the hydrocarbon.

3. The process of claim 1, wherein toluene is the hydrocarbon.

References Cited in the file of this patent

UNITED STATES PATENTS

| | | |
|---|---|---|
| 2,042,224 | Groll et al. | May 26, 1936 |
| 2,125,490 | Davis | Aug. 2, 1938 |
| 2,300,734 | Smith | Nov. 3, 1942 |
| 2,588,123 | Kern | Mar. 4, 1952 |

OTHER REFERENCES

Levy: Bull. Soc. Chim. (France), 4th Series, vol. 33, pp. 1661–3 (1923).
Bogert et al.: J.A.C.S., vol. 56, p. 959 (1934).
Bruson et al.: J.A.C.S., vol. 62, p. 36 (1940).
Smith: J.A.C.S., vol. 70, p. 2209 (1948).